Patented Nov. 1, 1927.

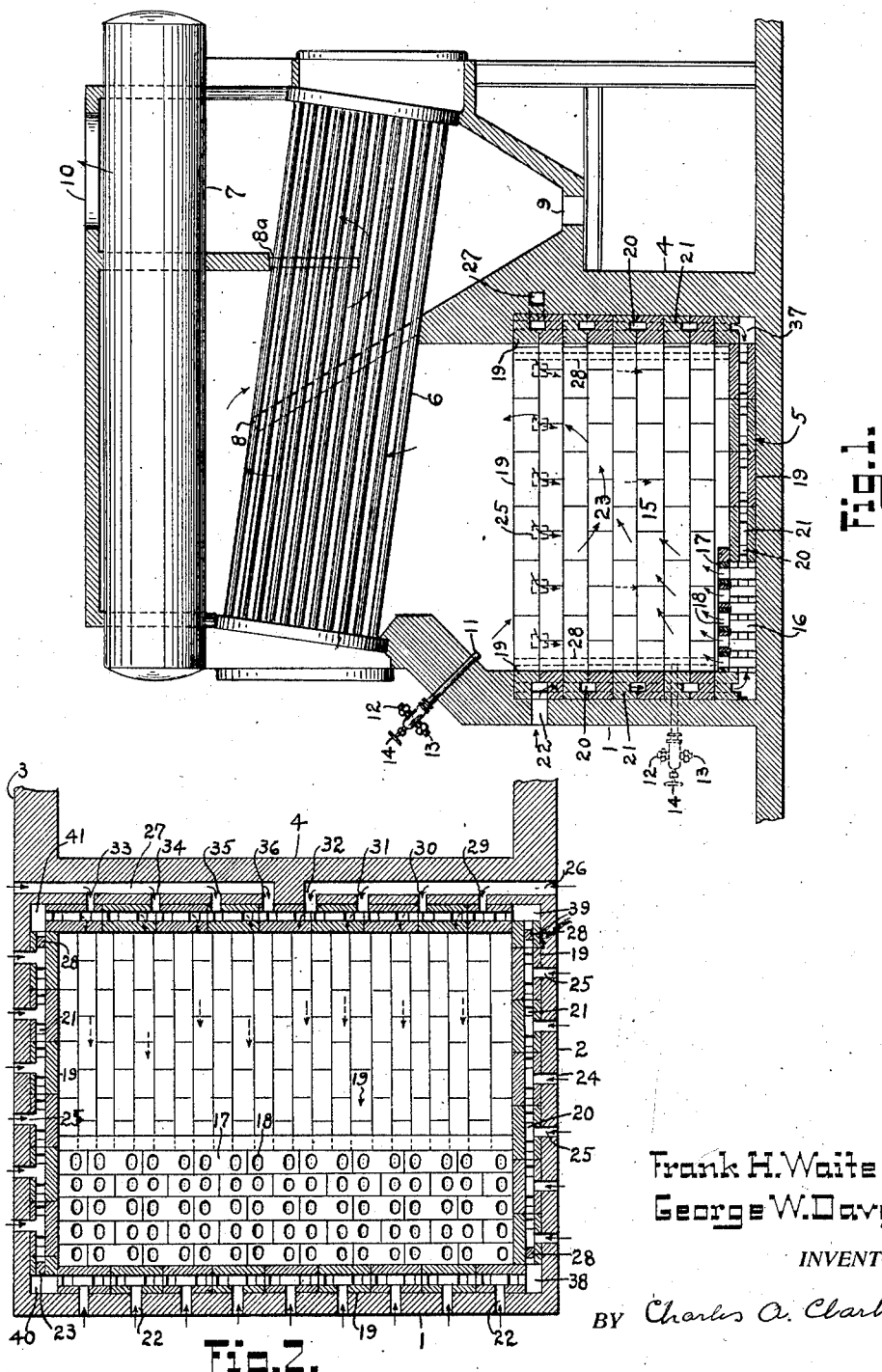

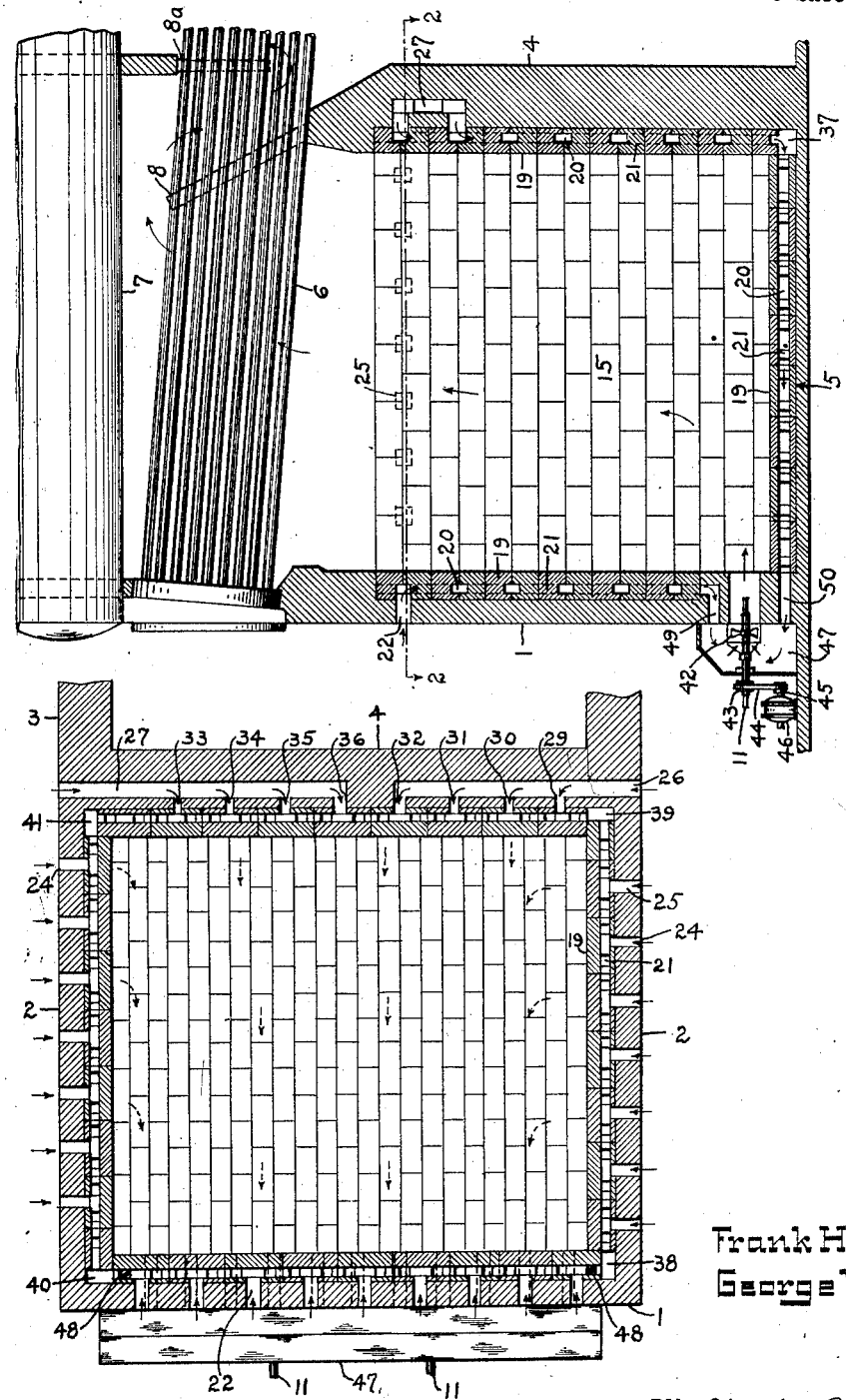

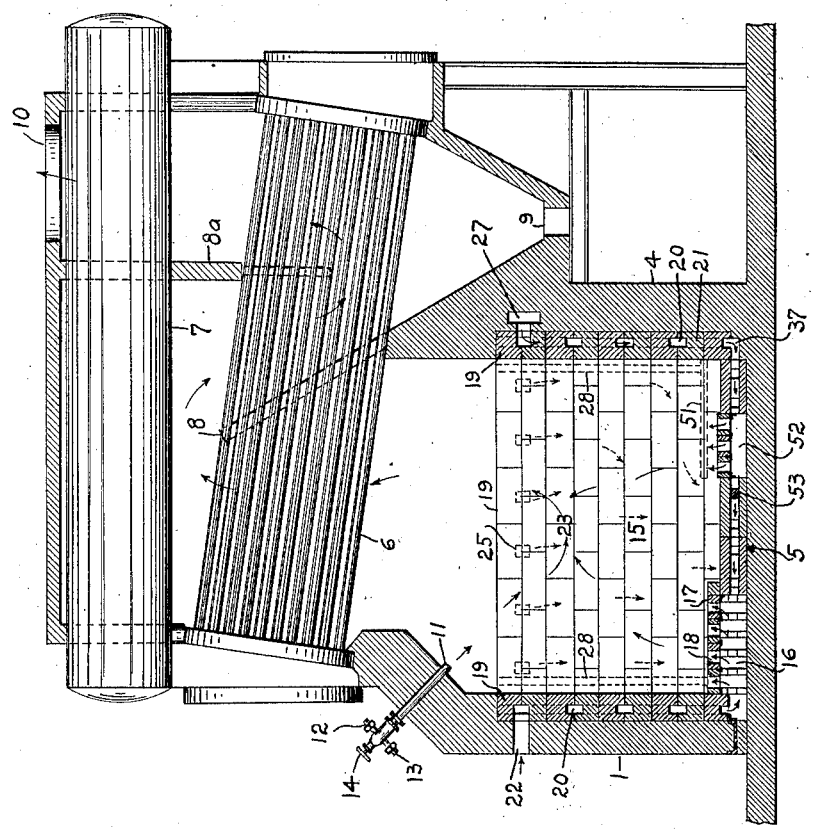

1,647,160

UNITED STATES PATENT OFFICE.

FRANK H. WAITE AND GEORGE W. DAVEY, OF LONG ISLAND CITY, NEW YORK.

FURNACE.

Application filed September 17, 1925. Serial No. 56,927.

Our invention relates to furnace construction, and particularly to the circulation of air in furnace walls whereby the air drawn by natural or stack draft, cools the walls, is preheated, reduces radiation losses, conserves the heat units and the preheated air is utilized for completing the combustion of the oil fuel sprayed into the combustion chamber through a burner or burners.

This is accomplished by utilizing the heat transfer function of our air cooled furnace blocks specifically illustrated, described and claimed in our application bearing Serial Number 55,752, filed September 11th, 1925.

Our invention also contemplating the combinations of air circulations by natural or stack draft, more specifically relates to the utilizing of preheated air thus obtained for a more perfect combustion of the fuel, and is particularly useful in connection with oil fuel or oil burning furnaces or the like.

The air circulations shown in the drawings hereto, as applied in generic combination substantially basic in principle, constitute something new and useful in the art.

One object of our invention is to circulate air within furnace walls, to prevent disintegration and utilize the preheated air thus obtained for completing the combustion of the fuel or flaming gases within the combustion chamber.

Another object of our invention is to flow the air within the walls against the flow of the hot gases within the furnace, unite the preheated air with the fuel sprayed within the combustion chamber for more perfect combustion therein and flow the same in a direction parallel or with the flow of hot gases within the furnace.

A still further object is to provide means whereby the walls and floor of the combustion chamber are cooled and all of the available surface of the interior of the combustion chamber is utilized for the specific purpose of increasing the efficiency, service and life of the furnace.

Another valuable feature of our invention is to subdivide the preheated air circulating within the furnace walls, with the object in view of combining a multiplicity of circulations in such a way that a greater efficiency will be obtained under abnormal conditions or induced draft or the like where the furnace is run above the normal capacity.

The salient features of our invention and the basic principles hereafter described and pointed out are illustrated in the accompanying drawings, in which:—

Figure 1, is a longitudinal section of a water tube boiler furnace using oil as a fuel and shows the relative position of the blocks and the circulation of the preheated air through checker blocks in the walls and the floor.

Figure 2, is a plan view in section of a part of Figure 1, clearly illustrating the circulation not shown in Figure 1.

Figure 3, is a longitudinal section of a modified form of water tube boiler furnace using oil as a fuel wherein the preheated air from the walls and floor is collected in a manifold and delivered to the combustion chamber.

Figure 4, is a plan view in section of a part of Figure 3, clearly illustrating the circulation of air.

Figure 5, is a longitudinal section of a water tube boiler furnace using oil as a fuel wherein the relative position of the blocks as shown and the circulations of preheated air illustrated show a modification of the invention whereby different circulations of air are directed into the combustion chamber through checker brick in the floor.

Figure 6, is a plan view in section of a part of Figure 5, clearly illustrating the circulations of air.

In the drawings, Figures 1 and 2, illustrate a water tube boiler furnace consisting of the furnace front wall 1, side walls 2 and 3, bridge wall 4, bottom 5, water tubes 6, drum 7, baffles 8 and 8$^a$, clean-out opening 9, and stack or gas outlet 10.

The front wall 1, is provided with an oil burner 11, having an oil inlet 12, a steam inlet 13 and a valve 14, shown in full at the top of the combustion chamber 15, or the burner may be located at any other convenient and suitable place such as shown by the dotted lines.

The circulations are directed to the one object in view of carrying air through the furnace walls, cooling the blocks, and delivering the preheated air through checker blocks in the floor toward the front of the furnace into the combustion chamber, for the purpose of a more perfect combustion of the products; and the front wall, side walls and bridge wall each have individual circulations and deliver the preheated air into the combustion chamber 15, at the same relative place, that is to say the space 16 under the checker work or bricks 17, provided with holes 18.

The front wall 1, including in its makeup a series of superimposed, broken jointed unit blocks 19, is provided, upon its completion, with a multiplicity of horizontal passages or flues 20, and a multiplicity of vertical flues 21.

The air enters into the air cooled blocks in the front wall through the passages or ducts 22, passes downwardly and throughout the walls through the horizontal and vertical passages 20 and 21 respectively, enters into the space 16 under the checker brick, and is directed into the combustion chamber 15 where it combines with the products of combustion.

The steam and oil from the burner 11, enters the combustion chamber 15 as shown in Figure 1, and at some point within the combustion chamber 15, which point for the purpose of illustration is taken at 23, combustion takes place and as shown by the arrows in said Figure 1, the hot gases pass over baffles 8, under baffles 8a and upwardly through the gas outlet 10 to the stack.

The side walls 2 and 3, like the front wall 1, include in their makeup, a series of superimposed, broken jointed unit blocks 19, which upon the completion of the wall provide a multiplicity of horizontal flues or passages 20 and a series of vertical flues 21.

The side walls also are provided with vertical baffles 28, to direct the air downwardly, which air enters the air cooled wall at 24, through passages, ducts or openings 25, passes under and through the floor by way of the passages in the blocks heretofore referred to, enters the space 16 under the checker blocks 17 and finally passes preheated through the holes 18 in said checker blocks 17 and enters the combustion chamber 15 for more complete combustion at 23.

The bridge wall 4, like the front and side walls 1, 2 and 3, includes in its makeup, a series of superimposed, broken jointed, unit air cooled blocks 19, which upon the completion of the wall provide a multiplicity of horizontal flues or passages 20 and a series of vertical flues 21.

The air enters the bridge wall through two separate ducts 26 and 27, one on each side of the furnace.

There are several passages 29, 30, 31 and 32 leading from the duct 26 to the flues 20 and 21 in wall 4 which vary in area, the one of the greatest area being in proximity to the center of wall 4.

Duct 27 is similar to duct 26 and has similar passages 33, 34, 35 and 36, which likewise vary in area for the same purpose in view of equally distributing the air through the passages 20 and 21 in the wall. The air entering the air cooled blocks in the bridge wall, one half from each side through the supply ducts 26 and 27 flows or passes downwardly through the wall, into a header or main duct 37, from whence it passes through the passages 20 and 21 in the floor blocks 19 into the space 16 under the checker blocks 17, passes through the holes 18 in the checker blocks and finally unites with other products to complete combustion at 23.

The expansion of the blocks is provided for in the front wall by the space 38, in the side walls by the spaces 39 and 40 and in the bridge wall by the space 41.

In Figures 3 and 4 the air circulates downwardly in all the walls as in Figures 1 and 2 and is delivered into a manifold 47, in front of the furnace from which manifold the preheated air is drawn and flows into the combustion chamber 15 with the oil or products of combustion assisted by fan 42, driven by pulley 43, belt 44, pulley 45 and motor 46.

The front wall in Figure 3 is of similar construction as that in Figures 1 and 2, and is provided with baffles 48 to direct the flow of air through the openings or flues 22, into the horizontal and vertical flues 20 and 21, of the air cooled blocks 19, into a manifold 47, through a series of passages 49.

The side walls are provided with inlets 24, through which the air enters the horizontal and vertical flues 20 and 21 in the air cooled blocks 19, passes downwardly into the flues 20 and 21 in blocks 19 in the floor and thence toward the front of the furnace through a series of flues or passages 50 into the manifold 47.

The air enters the bridge wall in a similar manner, through similar ducts, located in a like manner as in Figures 1 and 2, hereinbefore described, passes through the walls, entering the header or main duct 37, from which it passes by means of the flues 20 and 21 in the floor blocks 19, forwardly into the manifold through the series of flues 50.

Thus the air from the front wall 1, side walls 2 and 3 and bridge wall 4, flows to a common manifold 47 where it is utilized as preheated air after having cooled the blocks through which it had passed, taking up part of the heat therefrom by convection and this preheated air thus collected in the manifold is drawn by the fan 42 or the like, and enters with the other products of combustion in to the combustion chamber 15, from which the hot gases pass as hereinbefore stated to the outlet 10.

The circulations illustrated in Figures 5 and 6 are similar to those shown in Figures 1 and 2 except that one third of the preheated air enters the combustion chamber 15 in proximity to the bridge wall 4 and two thirds enters the combustion chamber in proximity to the front wall 1 for the purpose of better distribution of the preheated air when the furnace is running under heavy load or at full or over capacity.

The circulation of air in the front wall is similar to that in Figures 1 and 2 to all intents and purposes.

The circulation of air in the side walls in general is the same as hereinbefore described relative to Figures 1 and 2 except that the lower rear part of the walls are baffled by the baffles 51 to direct the air into the floor at a point in front of the baffle 53 in the floor 5. The air from the side walls passes through the passages 20 and 21 in blocks 19 on the floor 5 into the chamber or space 16 from whence it, constituting two thirds of the circulation with the front wall air, enters the combustion chamber 15, through the openings 18, in the checker blocks 17, combining with other products of combustion at 23, and finally passes out of the furnace as shown by arrows at 10.

In Figure 6 a typical control damper 54 is shown with a slide 55 to control the volume of air in the ducts 26 and 27.

These dampers or any suitable equivalent may be used for the purpose of controlling the air in any or all of the inlets supplying air to the horizontal and vertical passages 20 and 21.

Having thus described and illustrated the preferred embodiment of our invention, we do not desire to limit ourselves to the exact subject matter pertaining to the specific circulations in combination, as modifications may be made without departing from the spirit of the invention or scope of the claims.

We claim:—

1. In combination, in a furnace construction, refractory walls having intersecting vertical and horizontal air passages therein, air inlet means to said passages in the upper part of said walls, a refractory floor having longitudinal and transverse air passages therein communicating with said wall passages and air ports leading from the floor passages into the bottom of the furnace chamber, and fuel feeding means adapted to deliver the fuel into the chamber in the region above said air ports.

2. In combination, in a furnace construction, refractory walls having intersecting vertical and horizontal air passages therein, air inlet means to said passages in the upper part of said walls, a refractory floor having longitudinal and transverse air passages therein communicating with said wall passages and air ports leading from the floor passages into the bottom of the furnace chamber, and fuel feeding means adapted to deliver the fuel into the chamber in the region above said air ports, together with baffles in certain of said wall passages near the ends of the walls, extending toward the floor passages.

3. In combination, in a furnace construction, refractory walls having intersecting vertical and horizontal air passages therein, air inlet means to said passages in the upper part of said walls, a refractory floor having longitudinal and transverse air passages therein communicating with said wall passages and air ports leading from the floor passages into the bottom of the furnace chamber, fuel feeding means adapted to deliver the fuel into the chamber at a point above said air ports, an offtake in an upper part of the chamber for the products of combustion, and baffles positioned substantially vertically in certain of the passages in said walls so as to cause the air drawn through the inlets, passages and ports to pass through the walls and floor of the furnace in a general direction substantially opposite to that of the combustion stream in passing from the feeding means to the offtake and to enter the chamber near the region of combustion and pass through the chamber with the products thereof.

4. In combination, in a furnace construction, refractory side walls, front wall, and bridge wall, having intersecting vertical and horizontal air passages therein; air inlet means to said passages in the upper part of said walls, the inlet means for the bridge wall including a duct extending thereinto through a side wall having a series of inlet ports into the bridge wall passages, said inlet ports being progressively of larger cross-sectional area toward the center of the bridge wall; a refractory floor having longitudinal and transverse air passages therein communicating with said wall passages and air ports leading from the floor passages into the bottom of the furnace chamber; and fuel feeding means for the furnace.

5. In combination, in a furnace construction, refractory side walls, front wall, and bridge wall, having intersecting vertical and horizontal air passages therein; air inlet means to said passages in the upper part of said walls, the inlet means for the bridge wall including a duct extending thereinto through a side wall having a series of inlet ports into the bridge wall passages, said inlet ports being progressively of larger cross-sectional area toward the center of the bridge wall; fuel feeding means for the furnace; and means conducting the air from the side, front, and bridge wall passages and communicating with the furnace in the vicinity of the fuel feeder.

Signed at Long Island City in the county of Queens and State of New York this 15th day of September, A. D. 1925.

FRANK H. WAITE.
GEORGE W. DAVEY.